United States Patent
Pettersson

(10) Patent No.: US 8,750,384 B2
(45) Date of Patent: Jun. 10, 2014

(54) METHOD AND APPARATUS FOR AVOIDING QUALITY DETERIORATION OF TRANSMITTED MEDIA CONTENT

(75) Inventor: Martin Pettersson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 400 days.

(21) Appl. No.: 13/139,379

(22) PCT Filed: Dec. 15, 2008

(86) PCT No.: PCT/SE2008/051462
§ 371 (c)(1),
(2), (4) Date: Jun. 13, 2011

(87) PCT Pub. No.: WO2010/071504
PCT Pub. Date: Jun. 24, 2010

(65) Prior Publication Data
US 2011/0243246 A1    Oct. 6, 2011

(51) Int. Cl.
*H04N 7/12*    (2006.01)
*H04B 1/66*    (2006.01)

(52) U.S. Cl.
USPC .................. 375/240.24; 375/240; 375/240.16

(58) Field of Classification Search
None
See application file for complete search history.

(56) References Cited

U.S. PATENT DOCUMENTS

| 5,953,076 | A * | 9/1999 | Astle et al. ..................... 348/584 |
| 6,661,422 | B1 | 12/2003 | Valmiki et al. |
| 7,254,824 | B1 | 8/2007 | Gordon et al. |
| 2004/0161225 | A1 | 8/2004 | Dawson |
| 2004/0190617 | A1 | 9/2004 | Shen et al. |
| 2005/0018770 | A1* | 1/2005 | Adolph et al. ........... 375/240.16 |
| 2007/0052854 | A1 | 3/2007 | Yeh et al. |

FOREIGN PATENT DOCUMENTS

| CN | 1868211 A | 11/2006 |
| CN | 101068364 A | 11/2007 |
| WO | 1126699 A2 | 8/2001 |

* cited by examiner

*Primary Examiner* — Joseph Ustaris
*Assistant Examiner* — Ellyar Y Barazesh
(74) *Attorney, Agent, or Firm* — Coats and Bennett PLLC

(57) ABSTRACT

In a method of distributing media content with overlay graphical information from a media server to a media client the graphical information is extracted from the media content and transmitted to a media client. Prior to encoding the media content, each frame that comprises an area of graphical information is processed in separate blocks, in a manner such that an introduction of visual arte facts in the vicinity of the graphical information is avoided. The encoded media content is then transmitted to the media client, where the media content will be reproduced by adding the graphical information as an overlay on top of the decoded media content, but without comprising any coding originated arte facts.

14 Claims, 11 Drawing Sheets

US 8,750,384 B2

METHOD AND APPARATUS FOR AVOIDING QUALITY DETERIORATION OF TRANSMITTED MEDIA CONTENT

TECHNICAL FIELD

The present invention relates to a method for avoiding a quality deterioration of media content that comprises a graphical information overlay when the content is reproduced on a media client. The present invention also refers to a media server adapted to execute the suggested method.

BACKGROUND

Mobile video is a distribution means that is becoming more and more popular with emerging services, such as e.g. mobile TV and video streaming. However, in order to be able to send video over a wireless network, the video has to be encoded using lossy compression, often at a high compression rate.

Compared to the quality that is usually achieved when media content is distributed via a fixed distribution network, such as e.g. for fixed TV distribution, the visual quality tend to be lower for mobile video distribution. To a large extent this is due to the much lower transmission bit rates that are used for mobile video distribution.

Mobile video distribution involves transmission of media content or one or more mobile media clients. Before media content is encoded at a media server, necessary pre-processing, including steps, such as e.g. colour format conversion, video format conversion and/or the frame rate conversion, may be, and are usually, executed in order to improve the quality of the media content after it has been decoded by a vide coded at the media client.

Most video codecs used today, such as e.g. MPEG-4, H.263 and H.264, are using block based coding where a transform is applied on a per block basis.

A macro block is a term commonly used in association with video compression and refers to a block unit having a size of 16×16 pixels. The block sizes used for a transform, such as e.g. the 2-dimensional Discrete Cosine Transform (DCT), are different for different codecs, and, thus, macro blocks are typically subdivided further into smaller blocks, such as into blocks consisting of 8×8 or 4×4 pixels. By way of example, MPEG-4 and H.263 uses an 8×8 pixel block size, while H.264 uses a 4×4 pixel block size.

Instead of sending pixel values over the network, coefficients obtained from a used transformation are sent for the respective blocks from the media server.

A 2-dimensional DCT transform is separable, which means that the basic transformation functions will be obtained by multiplying a respective 1-dimensional horizontal and vertical basis function together. For an 8×8 pixel block there are 64 basis functions, where the horizontal frequencies increase from the left to the right, while the vertical frequencies increase from top to bottom.

Except for rounding errors, no information is destroyed in this type of transformation. For an 8×8 pixel block, 64 pixel values are transformed into 64 DCT coefficients. By way of example, H.264 uses a 4×4 DCT-like transform, where 16 pixels are transformed into 16 DCT coefficients.

One of the first steps to be executed in the encoder of a video enabled media server is to execute a DCT transformation, where the result of the transform from pixel values is rounded to integers. After such a DCT transformation has been commenced, the energy will be efficiently concentrated, but at this stage there are still many coefficients that have to be coded. An example of such a DCT transformation matrix is illustrated in FIG. 1a, where 8×8 pixels, illustrated with the left matrix 100 are transformed into the corresponding 8×8 DCT coefficients, illustrated with the matrix 101 to the right.

One of the major bit savings in lossy video compression comes from quantization of the transform coefficients, which is typically executed next. However, a typical scenario may be described such that as the quantization step size increases, the accuracy of the decoded transform coefficients decreases, which typically will result in a quality degradation which will be visible to end-users when the video is displayed on a video enabled user device/media client.

In FIG. 1b an exemplified quantisation of the DCT coefficients obtained after the DCT transformation of FIG. 1a, is presented, where the DCT coefficients 101 are shown in the left matrix 101, while the resulting quantised coefficients are shown in the matrix 102 to the right of FIG. 1b. In this example the DCT coefficients have been divided by 10, and, thus, only 10 coefficients will have to be transmitted from the media server, but while the amount of data that has to be sent has been reduced considerably, also encoding artefacts have been introduced to the media content, as a result of the described process.

After having compressed the images, forming the media content by way of quantisation, a plurality of images, typically 10 to 30 images per second for video streaming, will have to be sent, in order to be able to provide the media content as video that can be rendered by a media client.

However, relatively often a large amount of the images will have a similar content, e.g. in situations where the background is exactly the same for two or more successive images.

FIG. 2 illustrates an example of how the required bandwidth may be reduced even more, by making use of the fact that content that has already been encoded can be used also for encoding of subsequent blocks, by way of executing motion compensation.

In FIG. 2, a first series of images 200-203 is representing an original video sequence, showing a figure that is moving to the right in front of a background that remains the same throughout the whole series. The series of images to be encoded on the basis of the media content of images 200-203, before it is sent to a media client, is illustrated with images 204-207.

A sequence of images normally starts with a first frame 204, where the complete image, i.e. the information of image 200, is being encoded, e.g. according to the encoding principles described above. This information is transmitted in a frame, which is typically referred to as an intra frame, or an I-frame.

In a second image 201, the figure is similar to the one of image 200, but it has moved to the right, towards the middle of the image. Therefore, instead of coding and sending all information about image 201, only the information about the movement between the images, i.e. the difference between the present image 201 and the previous image 200 will be encoded and sent in a next frame 205.

In a corresponding way the difference between image 201 and 202, as illustrated with frame 206, is identified, encoded and sent next, instead of sending the complete content of image 202. These types of frames are typically referred to as predicted frames, or P-frames.

In order to reduce the risk of loosing information during distribution, e.g. due to packet loss, and to be able to smoothly switch channel, another I-frame will be sent every now and then, and, thus, after a number of P-frames, 205 and 206, have been sent in the given example, the information of image 203, is transmitted in a subsequent I-frame 207.

Media content comprising blocks with high frequencies, i.e. blocks which comprise transform coefficients with high contrast, e.g. where the luminance of different pixels vary a lot from high to low luminance, often need to be encoded with many bits, i.e. with a low quantization, in order to achieve good visual quality for the reproduced video. One example where high frequencies are usually present is when a video comprises text, or any other similar type of graphical information that has been applied on the video, which usually tend to have sharp transitions between high and low luminance values, when shown together with images forming the video. This is a reason why video that includes graphical information as an overlay, often does not look that good when presented to a user at relatively low qualities, as is usually the fact for mobile video applications.

One way of trying to reduce this problem is to send the graphical information separated from the video content, and to later apply the separated graphical information as an overlay after the video has been decoded at a client. Such a process is commonly used for digital broadcasted TV applications.

Graphical information, as described in this document, typically includes, but is not limited to, sub-titles and other text information, logotypes, graphics presented in news programs, or score boards presented in sport events, which appears as an overlay on the video when presented to the end-users.

There are also other solutions known from fixed TV distribution where underlying text has been smudged in order to make a text overlay more visible.

There are a number of known methods that can be used for detecting and extracting text from media content, such as e.g. images and/or video.

U.S. Pat. No. 6,937,766 refers to a method for detecting, extracting and indexing text in video. The method can be applied e.g. to static text, scrolling text, overlay text, as well as in-scene text.

WO/2008/003095 relates to a method for extracting text from images for the purpose of searching in a text of a media content that comprises images, as well as in text in videos.

JP2005235220 suggests another method which is adapted to detect subtitles in a video, while EP0720114 refers to a method for detecting text caption in a video.

All of the documents cited above suggest different methods for detecting and/or extracting text and/or graphical information in media content comprising a series of images. The suggested methods do, however, fail to discuss or suggest any way of handling artefacts of a distributed video, which will most likely appear in the vicinity of graphical information, when a video comprising text and/or graphics is reproduced and displayed at a video client.

Sending graphical information separated from an encoded video is a commonly known and preferred way of transmitting video that includes graphical information over a narrow bandwidth channel. Separation of graphical information from the images normally requires that the graphical information is stored separate from the video content at the media source. Separating the graphical information from the video is, however, not always possible, since the provider of the video content does not always have full control of the graphical information.

As can be understood from the documents referred to above there are a number of ways of extracting graphical information from media content, using various image processing techniques. However, even if the extracted graphical information is transmitted separately from a media source/ media server to a media client and added to the decoded video as an overlay at the media client, as suggested above coding artefacts may, and will most likely, still be visible around the graphical information when the video is rendered at the media client. This phenomenon is typical, not only for video that comprises letters of a subtitle in an overlay as a result from encoding the underlying graphical information, but also for other types of media content, that involves distribution of one or more images.

In order to be able to transmit media content comprising some kind of overlay graphical information over a communication network there are principally three different scenarios to choose from.

According to a first scenario, which will now be presented with reference to FIG. 3, graphical information is included in the media content already at the media source. The graphical information is encoded together with the media content at a media server 300 that is controlled by the operator, before it is transmitted to a media client 301, such as e.g. a cellular telephone, a laptop or a set top box, via a communication network 302.

In a first step 3:1, media content to be delivered to media client 301 is retrieved either from an external media source (not shown), e.g. if the media content refers to streamed video, or from an internal or external memory means (not shown), e.g. if the media content instead comprises stored content.

In a next step 3:2, the media content, including graphical content, is encoded, using any conventional codec. The encoded content is then transmitted, typically by way of broadcasting the content over a communication network 302, such as e.g. a mobile communication network, to one or more media clients that are tuned to the respective channel. This is indicated with a subsequent step 3:3. At the media client 301, the media content is received in a subsequent step 3:4, after which the content is decoded in a next step 3:5, and displayed via any conventional displaying means, in a final step 3:6.

Although the method described above is easy to implement, it is not recommended for distribution of media content that is distributed to media clients at low bit rates, since graphics, such as e.g. text, since, under the present circumstances, the graphic information tend to be hard to read.

According to a second, alternative scenario, which will now be described with reference to the flow chart of FIG. 4, graphical information of media content is instead separated from the media content at a media server 400 and can then be sent from the media server 400 to a media client 401 separated from the encoded media content. At the media client 401, the graphical information is then added as an overlay to the, encoded and transmitted media content, after decoding.

According to FIG. 4, graphical content that is provided together with other media content has already been separated from the media content at the media source, and, thus, in a first step 4:1, the general media content is retrieved from a media source, while the graphical content is retrieved in another step 4:2, after which the graphical content is transmitted to media client 401 in another step 4:3, and received by the media client 401 in a next step 4:4.

Alternatively, the graphical content may also be encoded in step 4:3, or even prior to that step, and sent as compressed content over the network 202. In such a case, the graphical content is also decoded in step 4:4, or in a step subsequent to step 4:4. Scalable Vector Graphics (SVG), is the primary compression method to be used for encoding extracted graphical information, where video coding can be seen as one possible alternative amongst others. If it is known that the graphical information is text and the used font, size and position of the text is also known, the text may alternatively be interpreted and sent as ASCII symbols. The procedures used for these particular aspects may be based on any conventional technique, and will therefore not be discussed in any further detail in this document.

The media content, comprising graphical content, is encoded, as indicated in a subsequent step 4:5, and the encoded media content is transmitted to media client 401 in another step 4:6. At media client 401, the encoded content is received, as indicated in a next step 4:7, and decoded, as indicated in a subsequent step 4:8.

In another step 4:9, the graphical information received in step 4:4 is added as an overlay to the decoded media content, and the media content can then be displayed to a user, as indicated with a final step 4:10.

The scenario described above is often preferred when video comprising overlay graphical information is to be transmitted to a media client, since it provides a reliable way of maintaining a relatively good visual quality when displayed at the media client.

Also according to a third scenario, illustrated with reference to FIG. 5, it is assumed that graphical information has been added to media content at a media server 500. According to this scenario, however, the media content that is retrieved from a media source in step 5:1 already comprises graphical content.

In a next step 5:2, however, the graphical content is identified and extracted from the remaining content, before it is transmitted to a media client 401 in a next step 5:3, and received by the media client 401 in a subsequent step 5:4.

As indicated in the previous scenario, also the graphical information may have been encoded, e.g. as SVG, before transmission to the media client 401. In such a case this information will be decoded at the media client 401, before it is added as an overlay in step 5:9.

In a next step 5:5 the media content is encoded, before it is transmitted, as indicated with another step 5:6. Remaining steps 5:7-5:10 correspond to steps 4:7-4:10 of FIG. 4.

A deficiency with both scenarios described so far is that the displayed media content tends to comprise visible artefacts around the graphical information when it is displayed at the media client. This is due the fact that the transform blocks containing graphical information tend to have a lot of high frequencies which, in terms of bits, makes these blocks expensive to encode, compared to encoding of blocks that comprise only lower frequencies.

SUMMARY

The object of the present invention is to address at least some of the problems outlined above. In particular, it is an object to provide a solution which enables media content that comprises overlay graphical information, and that is provided from a media server to a media client, to be rendered with a maintained visual quality, particularly as to the areas in the vicinity of the graphical information, when the graphical information has been added as an overlay to the media content at the media client.

According to one aspect, a method of distributing media content with overlay graphical information from a media server to a media client is provided, where at least one frame carrying media content and overlay graphical information is retrieved from a media source.

The graphical information is extracted from the media content, and transmitted to the media client. Each frame that comprises an area of graphical information is then processed in separate blocks, in a manner that avoids introduction of visual artefacts in the vicinity of the graphical information.

Each frame provided from the previous steps are then encoded, and transmitted to the media client (401).

The encoding procedure enables the media client to reproduce the media content by adding the graphical information as an overlay on top of the decoded media content, without any encoding originated artefacts. According to one embodiment, the processing step may comprise a first step of masking the area of block that comprises graphical information, and a second step of low-pass filtering the block.

According to another embodiment, the processing step may instead comprise a first step of detecting each block corresponding to a transform block of the media content that only comprises graphical information and another step of notifying the encoder of the media server to avoid encoding of the respective block.

According to yet another embodiment, the processing step comprises a first step of detecting each block corresponding to a transform block of the media content that only comprises graphical information, and another step of replacing such a block, typically with a block of a preceding frame. Alternatively, each pixel in a detected block may be set to a common single colour.

The suggested pre-processing mechanism is suitable for handling video, as well as other media content, comprising at least one image with graphical information added as an overlay.

According to another aspect, also a media server, adapted to execute the suggested method, is provided.

By applying any of the suggested pre-processing steps, prior to encoding media content to be provided to a media server, no artefacts that are normally introduced when graphical information is added as an overlay on media content will be introduced in the subsequent encoding step, and, thus, the quality of the media content will be maintained also after decoding and adding the graphical information to the media content at the media client.

Further features and benefits of the present invention will become apparent from the detailed description below.

BRIEF DESCRIPTION OF THE DRAWINGS

The present invention will now be described in more detail by means of exemplary embodiments and with reference to the accompanying drawings, in which:

FIG. 11a is a block scheme illustrating a processing unit architecture, adapted to execute media content processing according to the first embodiment, described with reference to FIG. 9a.

DETAILED DESCRIPTION

In order to diminish the negative impact that graphical information may, and typically will, have on the overall visual experience when media content that comprises overlay graphical information is being played out on a media client, a method for processing the media content at a media server, subsequent to the extraction of the graphical content, and prior to encoding the media content, is suggested. A suggested method, which is an improvement of the third scenario described above, will be described in more detail below.

A main purpose with processing media content before it is encoded is to make the encoding of the video smoother. Such a procedure, when executed according to any of the alternative embodiments that will be described in more detail below, will assure that the visible artefacts that are normally introduced by the encoding/decoding processes in the vicinity of graphical information overlaying a video will be diminished. As a consequence from such a processing step, also the bit rate of the media content will be reduced, thereby simplifying the coding/encoding of the media content, and to be executed with a maintained quality of the visible video also around the graphical information.

According to one embodiment, the quality will be maintained by applying content processing that comprises a step of altering the pixel values in blocks that contain graphical information, by way of low-pass filtering the media content, prior to encoding the media content.

According to another embodiment the processing may instead comprise the steps of identifying each block that is covered by graphical information and by notifying this to the encoder. In response to such information, the encoder will skip encoding such a block, since this block will only carry redundant information. The latter embodiment will require that the encoder is adapted to recognise and interpret such notifications.

According to yet another embodiment, which does not require any amendments to the encoder, each block that is found to be covered by graphical information may instead be replaced by a preceding block in the processing step. The encoder will then recognise the subsequent block as comprising only redundant information, and, thus, such a block will not be encoded.

Even though the following examples refer to video distribution, it is to be understood that the described method may also be suitable for processing various other types of media content, where graphical information is provided as an overlay on one or more images, and where it is a desire to maintain the visual image quality of the media content when it is rendered on a media client.

Figure 6:
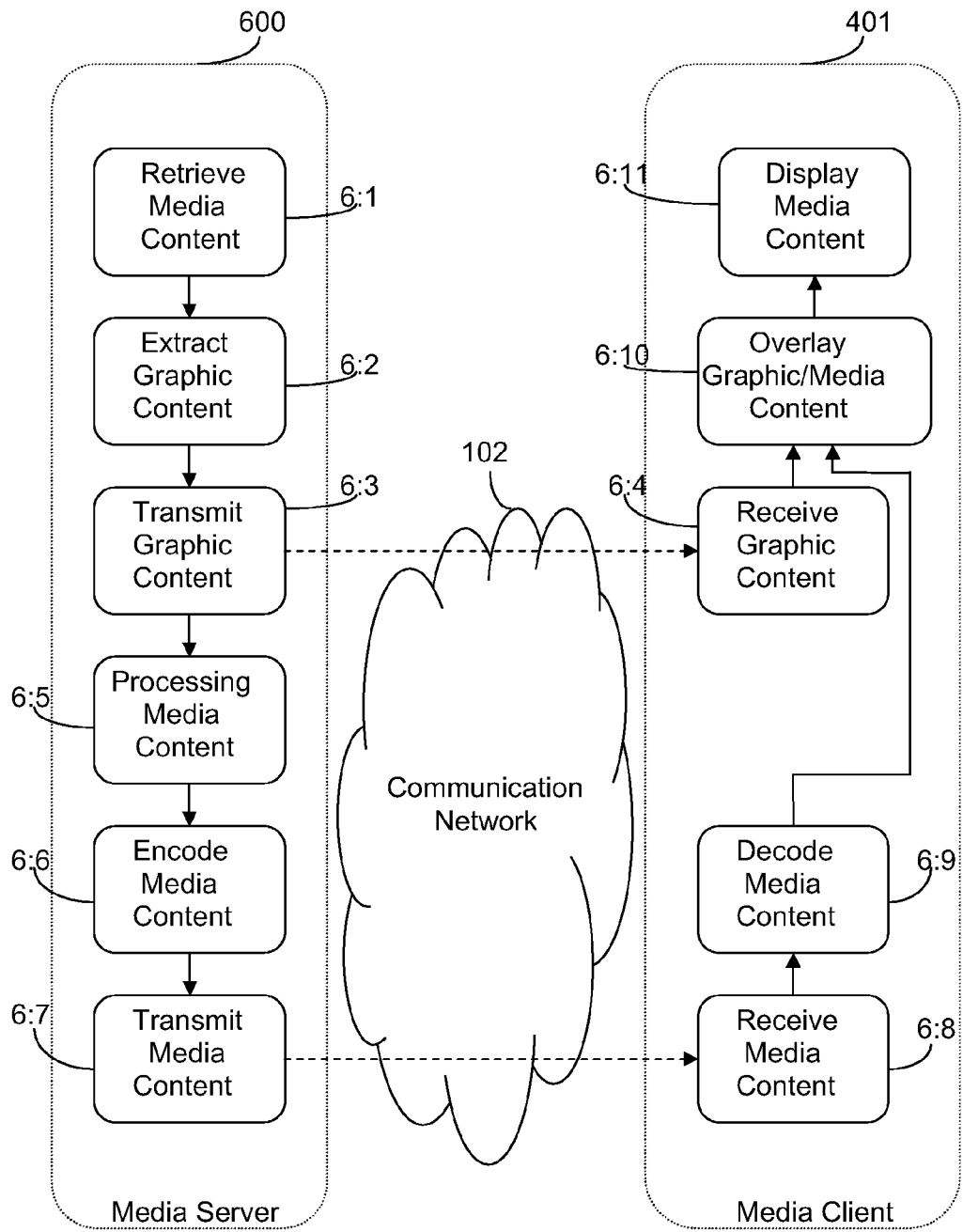
FIG. 6 is a flow chart illustrating a method of diminishing the negative impact that visual artefacts may have to encoded media content that comprises graphical information.

FIG. 6 is a flow chart, illustrating how media content may be processed at, a media server 600, and distributed to a media client 401 over a communication network 102, typically a mobile communication network.

As indicated above, media client 401 may be any type of conventional media client that is configured to handle overlay graphical content over images. Media server 600 is a media server that is configured to process media content according to any of the principles mentioned above, before the media content is encoded and forwarded to media client 401, for presentation on a displaying means.

Figure 5:
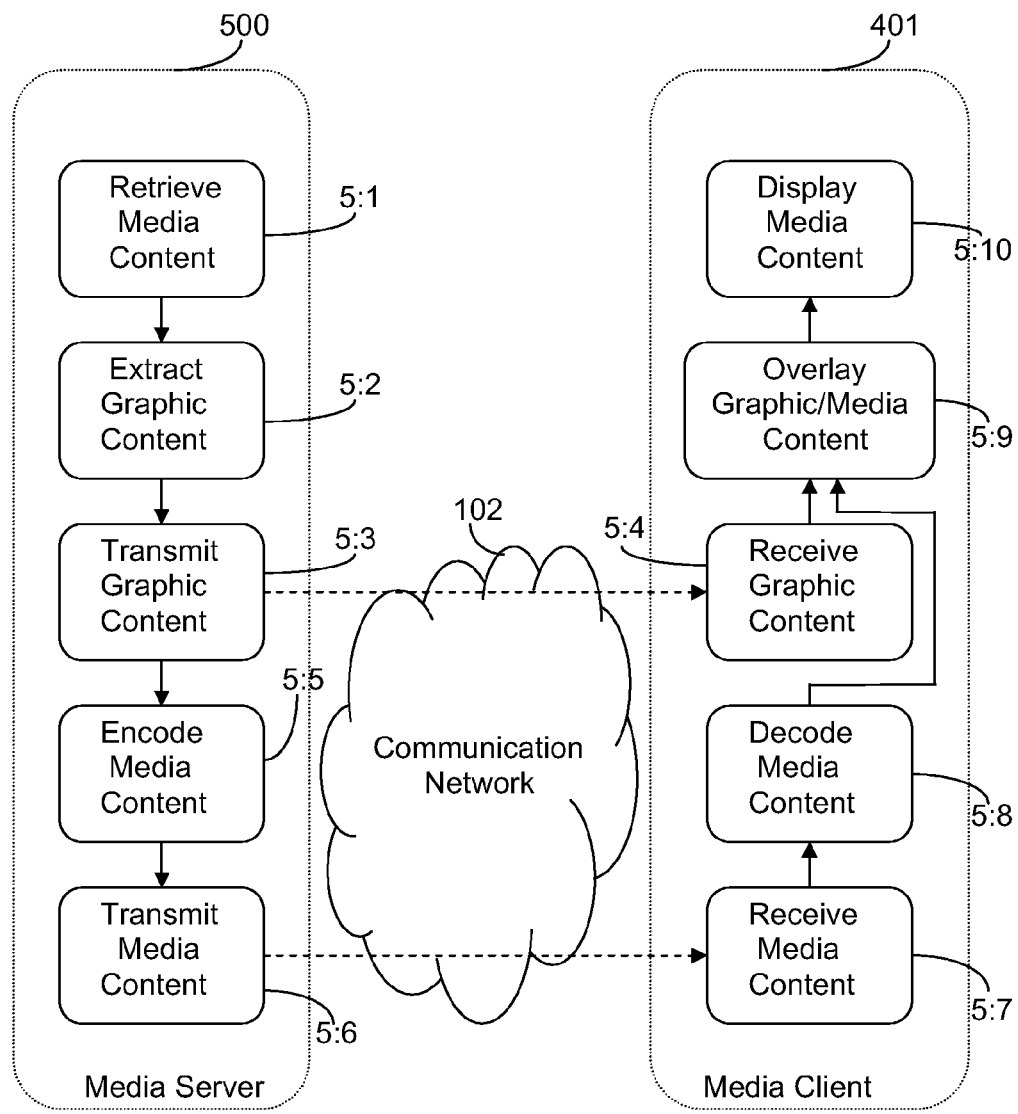
FIG. 5 is yet another flow chart, illustrating yet another method of distributing video, comprising graphical information, according to the prior art.

In FIG. 6, steps 6:1-6:4 correspond to steps 5:1-5:4 of FIG. 5, and will, thus, be executed according to the prior art. Subsequent to having extracted graphical media content from a video, and after having transmitted it to the media client 401, blocks comprising graphical information will be processed, according to any of the suggested methods, as indicated in a step 6:5, before the media content is encoded in a subsequent step 6:6, and transmitted to the media client 401 in a next step 6:7.

During processing, each frame that comprises graphical information is being processed in at least one separate block, before the respective block is handled accordingly by the codec. Blocks that do not comprise any graphical information will just be forwarded unprocessed to the encoder, where the content of the respective block will be encoded, according to any conventional encoding procedure. Since no changes will be required at the media client 401, steps 6:8-6:11 correspond to steps 5:7-5:10, respectively, of FIG. 5.

Figure 4:
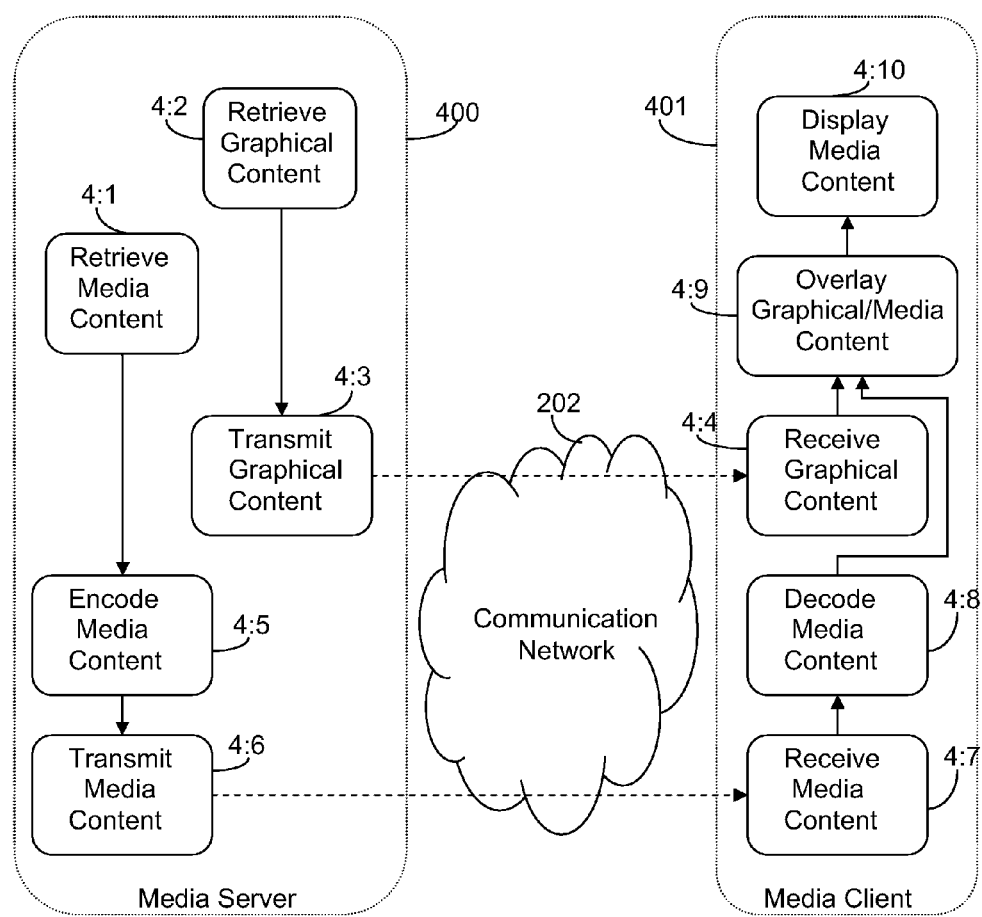
FIG. 4 is another flow chart, illustrating another method of distributing video, comprising graphical content, according to the prior art.

As mentioned for the two embodiments described above with reference to FIGS. 4 and 5, also the graphical information may be encoded, e.g. as SVG, before transmission to the media client 401, and decoded at the media client, prior to adding the information as an overlay to the media content in step 6:10.

The three different embodiments for processing media content prior to encoding will now be described in more detail.

According to the first embodiment, which relates to low-pass filtering, the processing step represented by step 6:5 in FIG. 6 may comprise a procedure for replacing the pixel values of each block, that comprise identified graphical information with low-pass filtered pixel values. The size of such a block typically is said to correspond to a transform block.

The processing step 6:5, when applied, according to this embodiment has a purpose of reducing the high frequencies of macro blocks, that are originating from the graphical information on the images, before the encoding process commences, so that the macro block becomes cheaper, in terms of bits, to encode with a maintained quality.

This type of processing will require that a low pass filtering unit is added to the media server, but no modifications to the video encoder will be required.

Figure 1A:
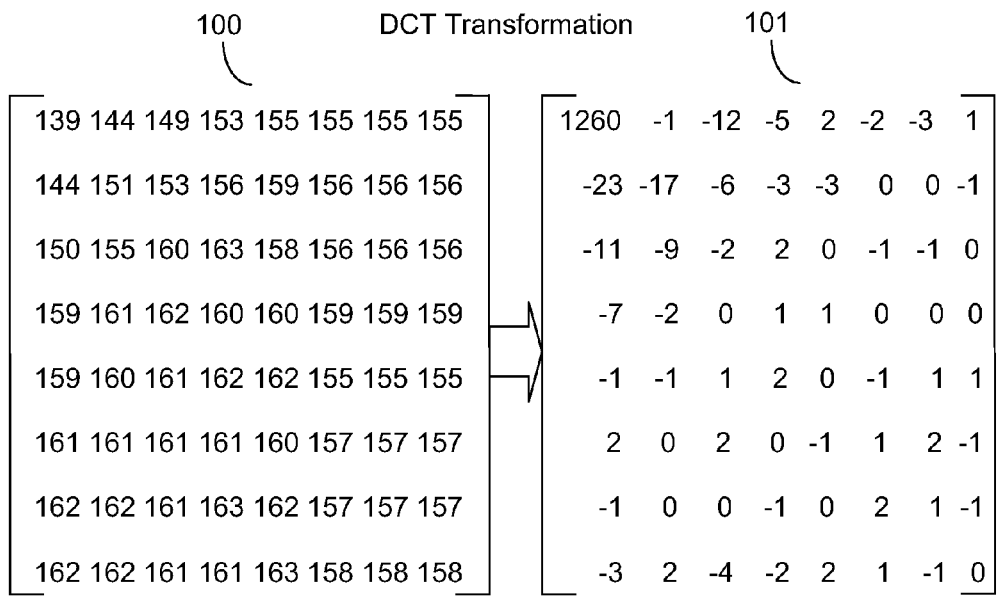
FIG. 1a is a matrix illustrating an exemplified result of an 8×8 DCT transformation of media content, according to the prior art.
Figure 1B:
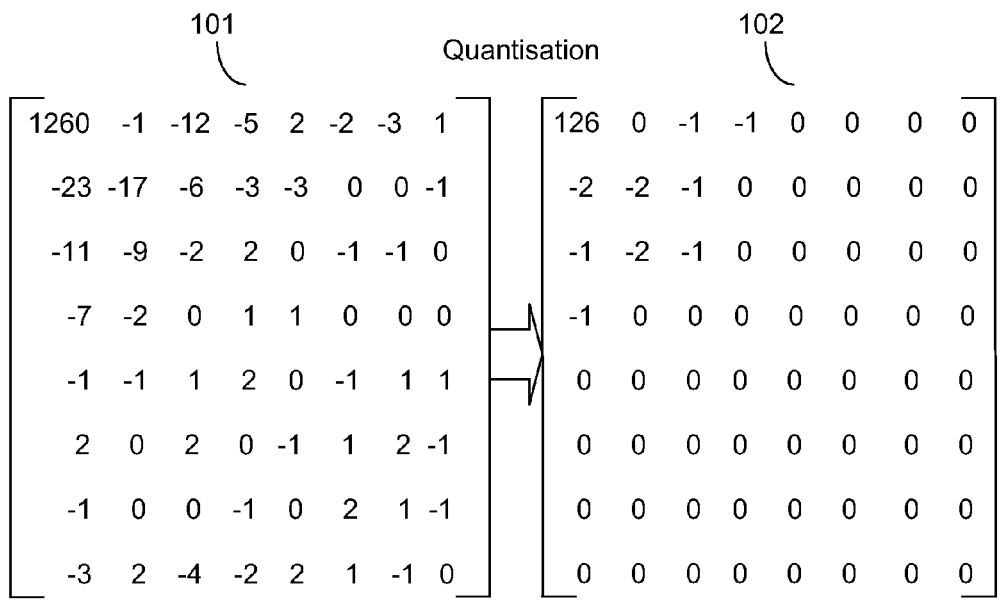
FIG. 1b is an illustration of an exemplified result of a quantisation of the DCT transformation illustrated in FIG. 1a, according to the prior art.
Figure 2:
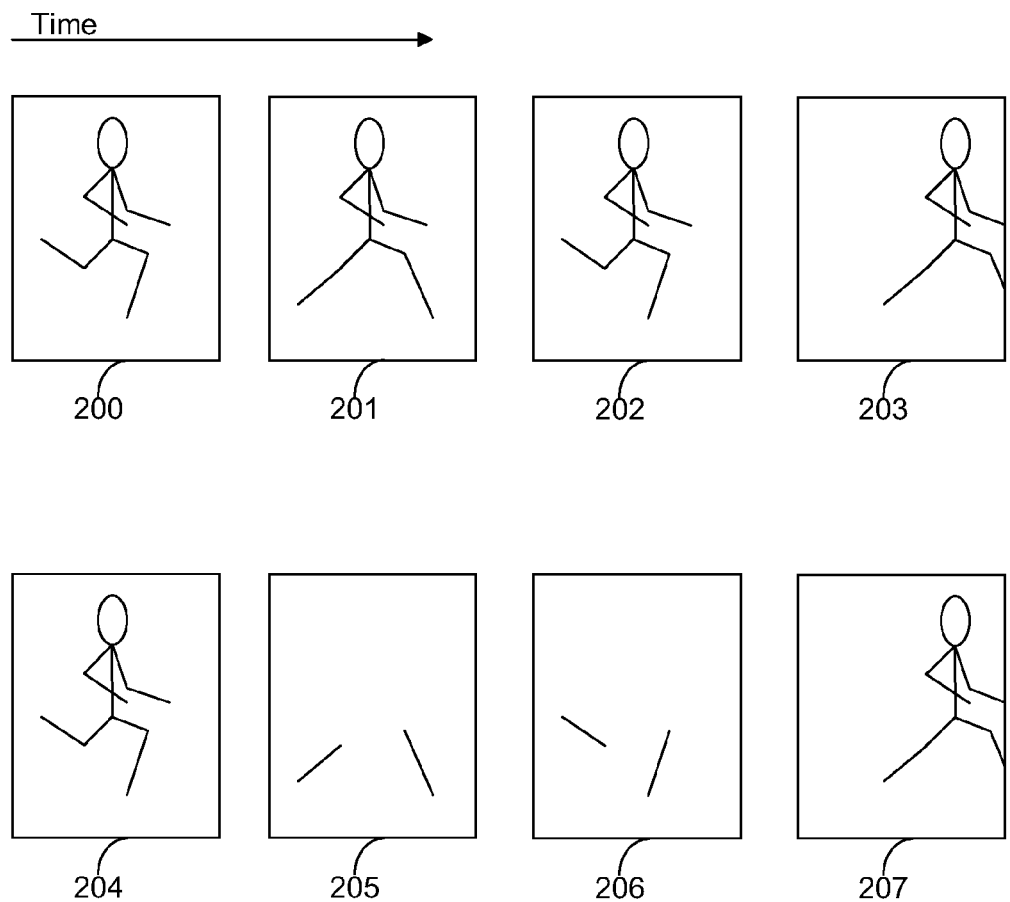
FIG. 2 is a series of frames, illustrating a method of executing motion compensation, according to the prior art.
Figure 3:
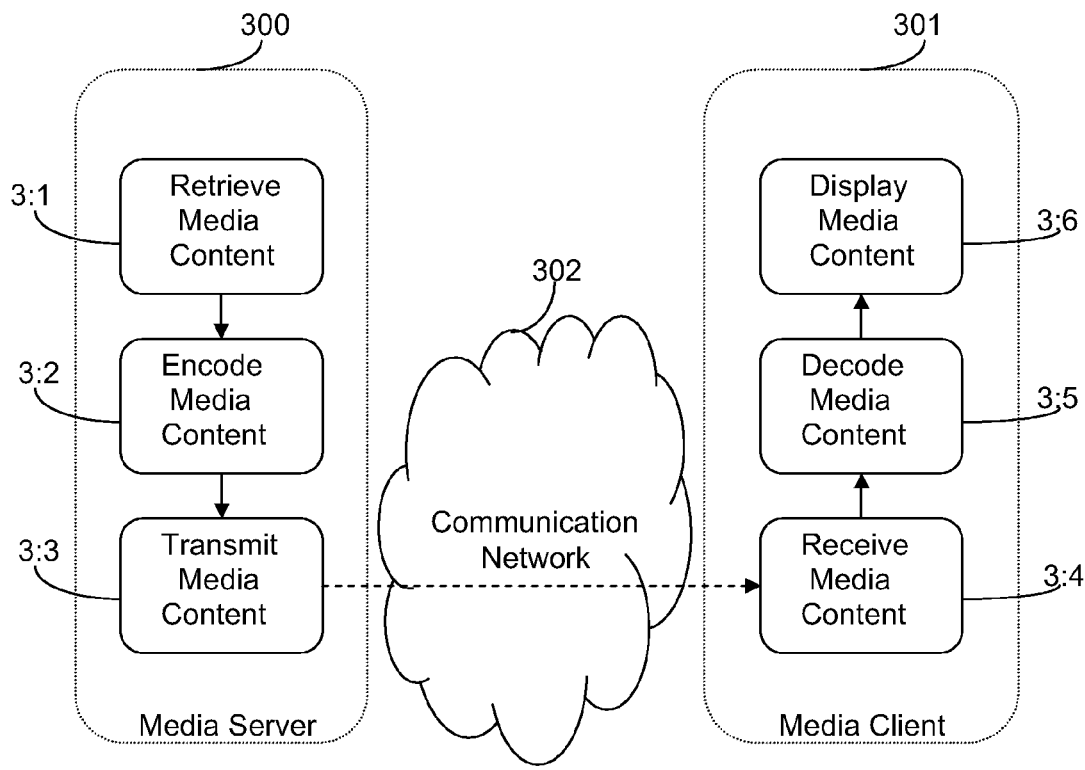
FIG. 3 is a flow chart illustrating a method of distributing video, comprising graphical content, from a media server to a media client, according to the prior art.
Figure 7:
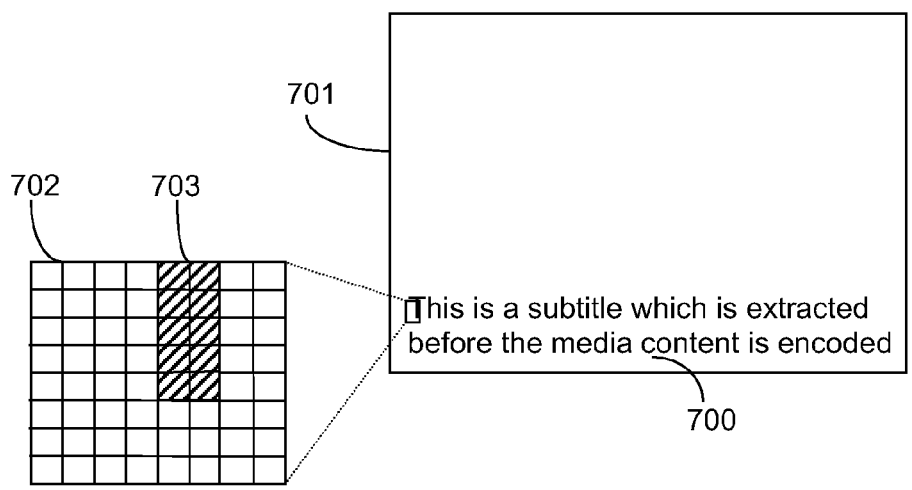
FIG. 7 is an exemplified illustration of how a masking of a piece of a subtitle text in an 8×8 pixel block may be executed, according to one embodiment.

FIG. 7 illustrates one way of performing such a low-pass filtering, where graphical information 700, in this case an area comprising a part of subtitle to the media content, of a frame 701 is being masked. In the zoomed in 8×8 pixel transform block 702, the masked part 703 of a T of the subtitle 700 can be clearly distinguished.

Figure 8A:
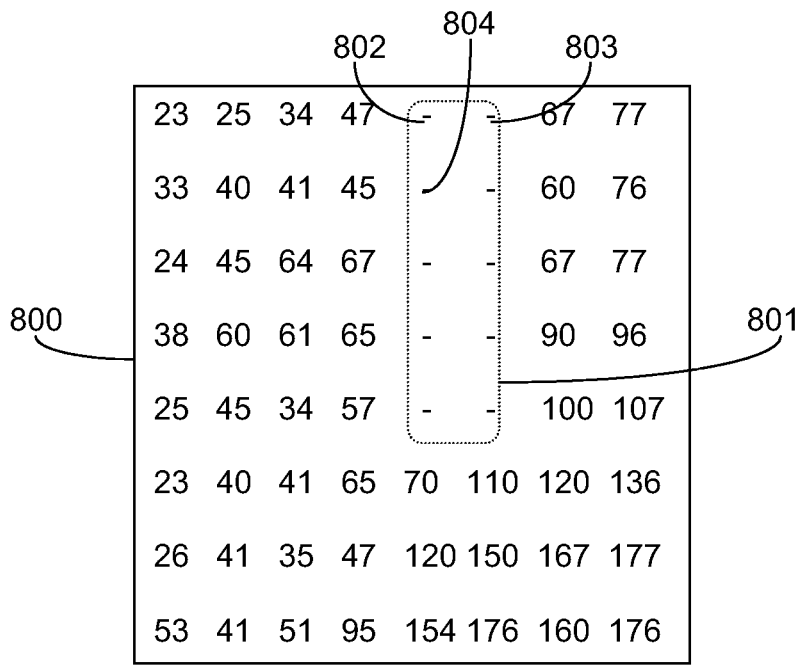
FIGS. 8a and 8b are two matrixes, illustrating an exemplified low pass filtering of an 8×8 pixel block.

If applicable for the used colour format, which may be e.g. RGB or YUV, the pixels of one of the components may have a pattern of pixel values, e.g. such as the one illustrated with the 8×8 matrix 800 of FIG. 8a, that represents the transform block 702 of FIG. 7.

Figure 8B:
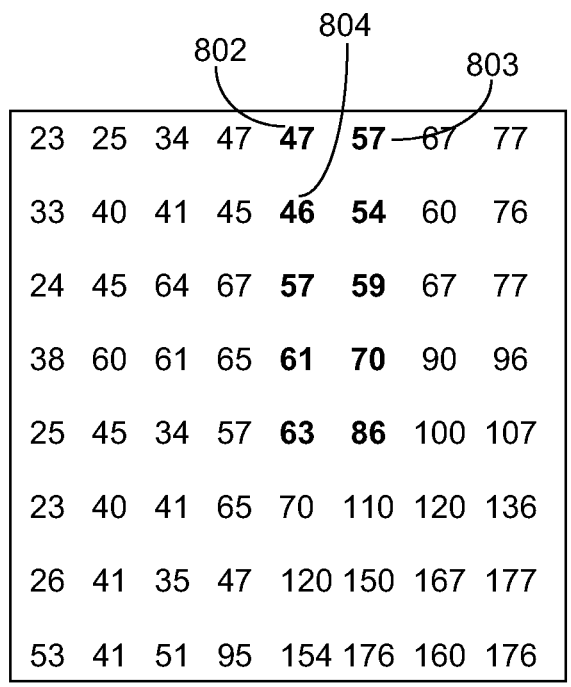

As indicated in FIG. 8a, the pixel values that correspond to the masked area 801, corresponding to the masked part 703 of FIG. 7, have been removed from the matrix. The top left pixel position 802 of the masked area only has one pixel value in its closest vicinity, namely 47. If each masked pixel is to be represented with a pixel value that is derived from the average of each other pixel value located in the next adjacent pixels, this pixel will also have a pixel value that equals 47. The top right pixel 803 now has two values, i.e. 47 and 67 adjacent to it, and, thus, this pixel value is set to the average of these values, i.e. to (47+67)/2=57. The second top left pixel 804 has the two adjacent values 47 and 45, and, consequently, this pixel value is set to (47+45)/2=46. The other empty pixel values are then calculated in the same way such that a resultant transform block will look like the matrix of FIG. 8b.

Alternatively, more pixels, such as e.g. the pixel values of the most adjacent, and the second most adjacent pixels can for example be used to calculate the average values for the masked pixels.

It is to be understood that the example illustrated above only describe one possible way of performing a low-pass filtering of the pixel values of a transform block and that other ways, or combinations, of calculating the pixel values of a masked area may be used instead.

Figure 9A:
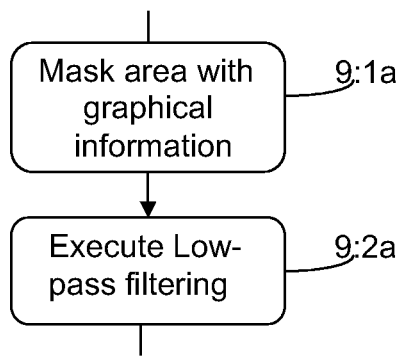
FIG. 9a is a flow chart, illustrating how media content may be processed, according to a first embodiment.

If processing according to the first embodiment is to be applied, the processing step of step 6:5 of FIG. 6 may be described with steps 9:1a and 9:2a, of FIG. 9a.

In a first step 9:1a of FIG. 9a, the area of a macro block that comprises graphical information is masked, and in a next step 9:2a, the pixel values of the macro block are low-pass filtered, e.g. according to the filtering method described above.

Figure 9B:
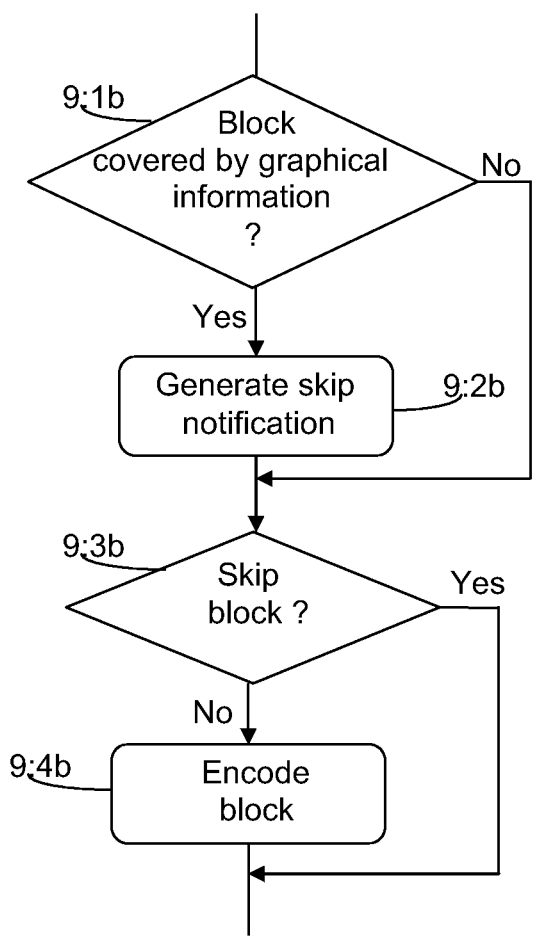
FIG. 9b is another flow chart, illustrating how media content may be processed, according to a second embodiment.
Figure 9C:
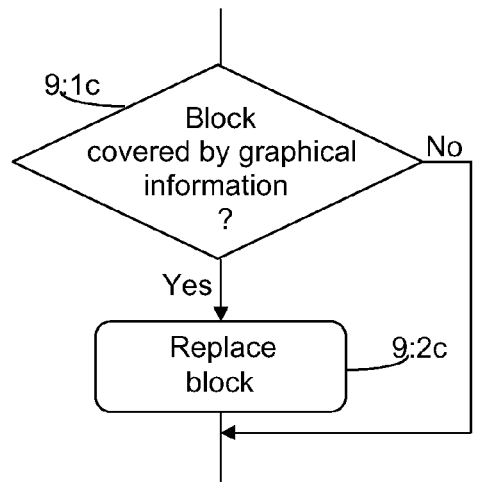
FIG. 9c is yet another flow chart, illustrating how media content may be processed, according to a third embodiment.

If processing is instead to be executed according to the second embodiment, the processing step 6:5 of FIG. 6 may instead be described with steps 9:1b and 9:2b, while the encoding step 6:6 of FIG. 6 may be described with steps 9:3b and 9:4b, as illustrated with the flow chart of FIG. 9b.

In a first step 9:1b of FIG. 9b, it is determined whether a macro block is covered by graphical information. If this is the case, a notification, which identifies the respective macro blocks, is generated in a next step 9:2b. In a subsequent step 9:3b, the encoder recognises a notification as an instruction to skip encoding of the respective macro block, and, thus, macro blocks for which no notification is identified are encoded in a conventional manner, as indicated with a step 9:3d, while notified blocks are transmitted to the media client without being encoded.

A processing step that applies replacement of macro blocks, according to the third embodiment, mentioned above, may be described with reference to steps 9:1c-9:2c.

In resemblance to step 9:1b of FIG. 9b, also for the third embodiment it is first determined whether the complete area of a macro block comprises graphical content in a first step 9:1c. If this is the case, the respective block is replaced by a preceding block, typically by copying a respective macro block from a previous frame. Such a block replacement step is indicated with a next step 9:2c.

As already mentioned above, a conventional encoder will recognise an identical macro block, and, thus, skip encoding of this block, without any modification being required at the encoder.

As an alternative to replacing a macro block, a macro block for which it has been determined that all pixels are within an area that comprises graphical information may instead be handled such that each pixel of the block will be given a single, common static colour. Such a macro block will then be cheaper to encode in terms of number of bits.

Moreover, motion compensated predictions where encoding of one frame may be based on the content of a previous and/or subsequent frame, as described above, may also be applied in order to find optimal pixel values for the masked pixels. The motion compensated prediction may typically be combined with a low pass filtering procedure.

It is to be understood that in a typical scenario, the same procedure is to be repeated for all of the components of the used color format, or for any other method used.

As indicated above, in order to be able to offer rendering of video, as well as other types of media content, with a maintained visual quality at a media client by running a method according to any of the embodiments described above, appropriate adaptations of a media server will be required.

An block scheme of a media server according to one exemplary embodiment will therefore now be described in further detail with reference to FIG. 10. It is to be understood that the described media server only represents one of a plurality of possible configurations, and that the architecture presented in FIG. 10 only comprises functional units that are needed for the understanding of the suggested method, and that other entities that are normally present in a conventional media server have been omitted for simplicity reasons.

Figure 10:
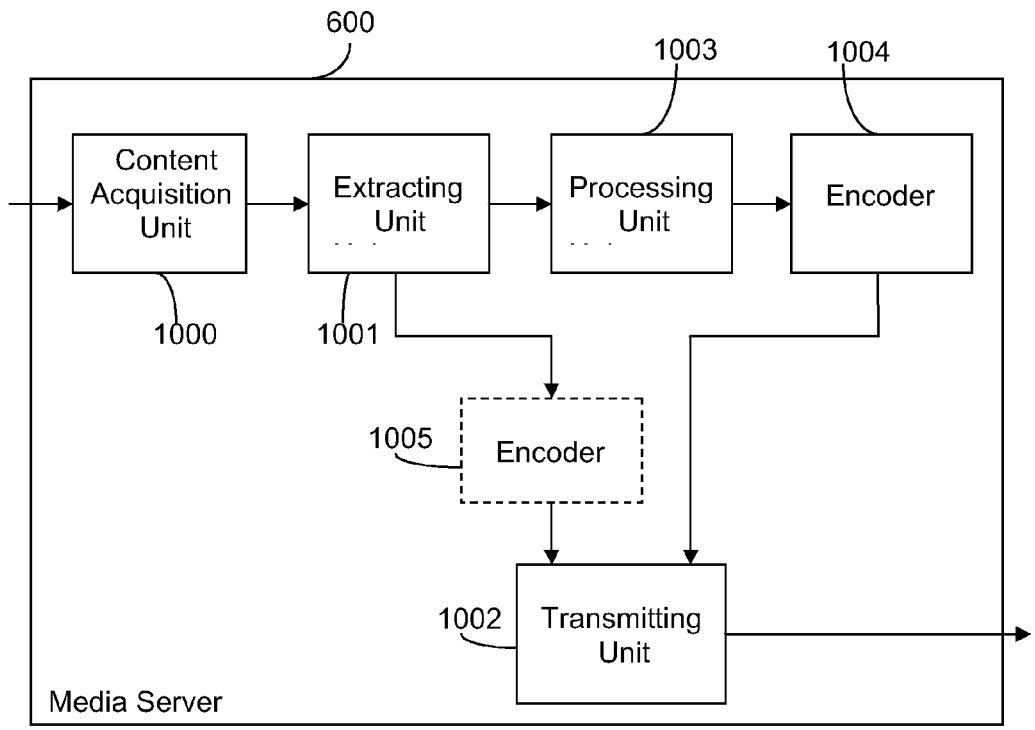
FIG. 10 is a block scheme, illustrating a media server adapted to execute the quality improvement method described with reference to FIG. 6, according to one exemplified embodiment.

According to FIG. 10, media server 600, comprises a unit, here referred to as a content acquisition unit 1000, that is adapted to capture or receive media content that may be retrieved from a media source, such as e.g. a video streaming source, or from a storage means, such as e.g. a DVD a blue-ray disc or a hard drive. Another unit, referred to as an extracting unit 1001, is adapted to recognise graphical content in the retrieved media content and to extract this graphical content from the media content.

The extracting unit 1001 is also adapted to forward the graphical media content to a transmitting unit 1002, from which the graphical media content is delivered to one or more media clients.

The media server 600 also comprises a unit that is referred to as a processing unit 1003, which as indicated above, is adapted to process the media content prior to the encoding. Frames that have been processed by the processing unit, as well as frames which are simply passing the processing unit unchanged are then provided to an encoder 1004. The encoded media content is then forwarded to one or more media clients via transmitting unit 1002.

In addition, if encoding of the extracted graphical content is to be applied prior to transmission, a suitable encoder 1005, such as e.g. SVG encoder, may be applied also for this purpose. Alternatively, encoder 1004, may be configured to handle also this task.

Depending on which processing mechanism that is applied at the media server 600, the processing unit will have to be configured accordingly.

A processing unit that is adapted to execute a low pass filtering procedure, may be configured as described below, with reference to FIG. 11a.

Figure 11A:
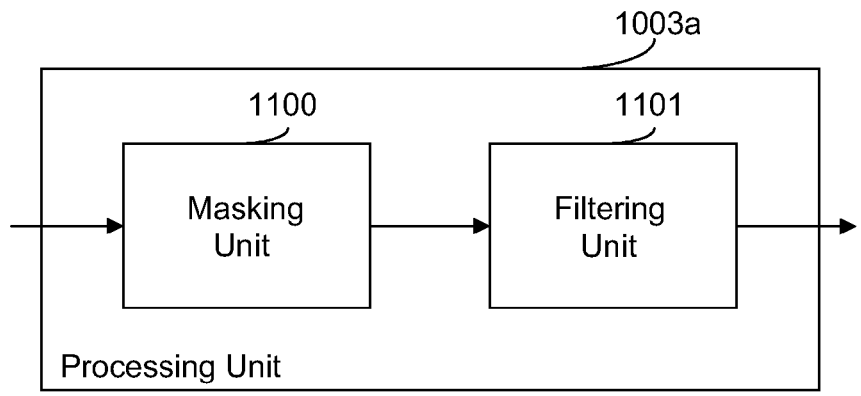

According to FIG. 11a, processing unit 1003a comprises a masking unit 1100, that is adapted to mask areas of a block that have been identified as comprising graphical information. Once the respective area has been masked, a filtering unit 1101 is adapted to execute a low pass filtering procedure on the block. Alternatively, the masking unit may also be adapted to fill the pixel mask, using a prediction from previous blocks/frames.

Figure 11B:
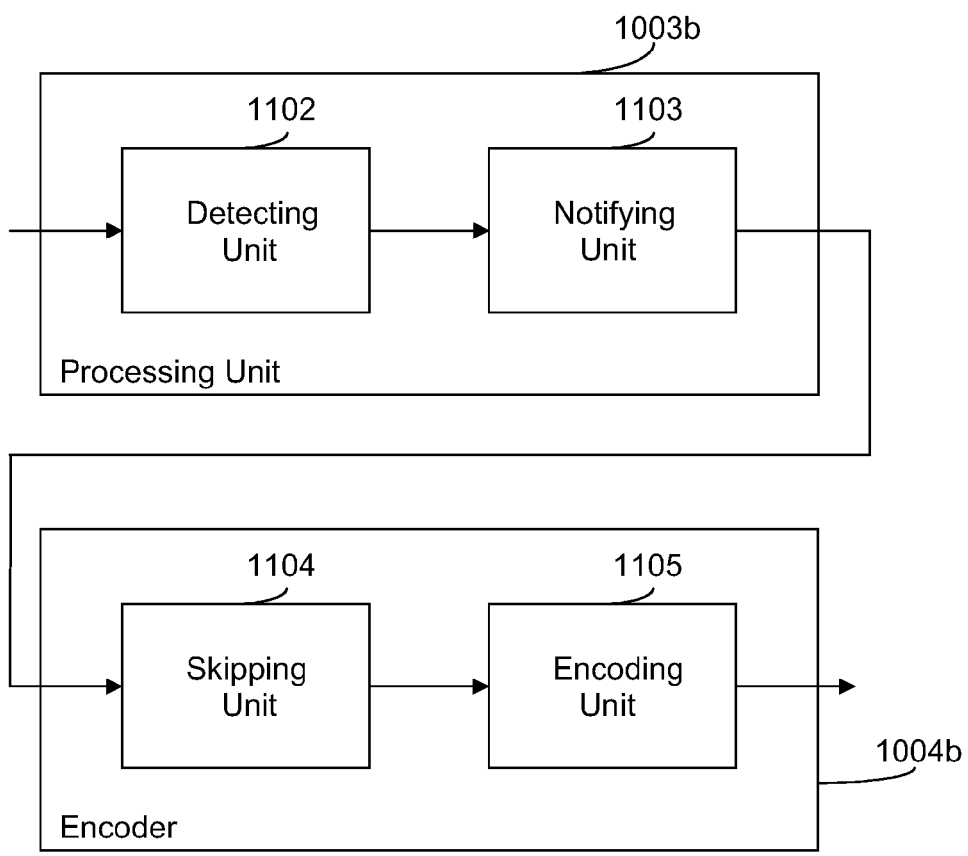
FIG. 11b is another block scheme, illustrating a processing unit and encoder architecture, adapted to execute media content processing according to the second embodiment, described with reference to FIG. 9b.

FIG. 11*b* is another configuration of a processing unit 1003*b* and an encoder 1004*b* of a media server 600, that is adapted to instead skip encoding of redundant macro blocks that have been found to carry only redundant information. Processing unit 1003*b* comprises a detecting unit 1102, which is adapted to detect macro blocks that only comprise graphical information. A notifying unit 1103 is then adapted to provide information to the encoder 1004*b*, that informs the encoder of which blocks to skip. The encoder 1004*b* on the other hand comprises a skipping unit 1104, that is adapted to identify each macro block that should not be encoded by encoding unit 1105 of the encoder 1004*b*.

Figure 11C:
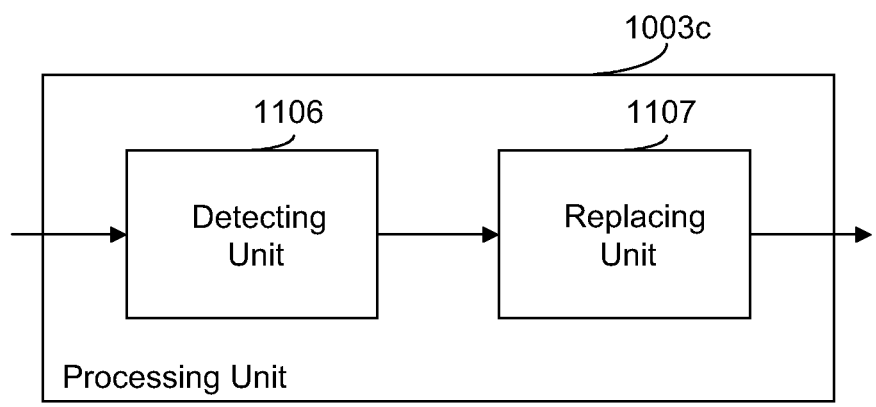
FIG. 11c is yet another block scheme, illustrating a processing unit architecture, adapted to execute media content processing according to the third embodiment, described with reference to FIG. 9c.

A third possible processing unit 1003*c* is described with reference to FIG. 11*c*, where, in resemblance to detecting unit 1102, a detecting unit 1106, is adapted to detect macro blocks that only comprise graphical information. A replacing unit 1107 is then adapted to replace the detected macro block with another block, typically a previous block, which will then be forwarded to the encoder (not shown) to which the processing unit 1003*c* is connected.

The quality improvement of a video is higher the smaller the video format is. This is due to the fact that the transform block size for a small video format, such as e.g. a format used by a mobile media client adapted to receive video, is relatively large compared to the entire frame size used for the video. For the same reason the potential quality improvements are better for codecs having a large transform block size, such as e.g. H.263 and MPEG-4, each having 8×8 pixel transform blocks.

The quality improvement is also higher for media content transmitted with low bit rates, since transform blocks comprising pixels with high contrast, such as e.g. blocks including graphical information, require more bits for enabling encoding with good quality, than blocks with low contrast, such as e.g. the blocks that have been low-pass filtered.

The potential quality improvements that can be gained from using the proposed method are higher for low quality video, and, therefore particularly suitable for services such as e.g. mobile video streaming and mobile TV, based on a standard such as e.g. DVB-H, MBMS or mobile video streaming.

However, the suggested pre-processing method may also make a quality impact both for video adapted for larger video formats, such as e.g. Standard Definition (SD) and High Definition (HD), as well as services adapted for transmissions of higher bit rates, such as e.g. IPTV, broadcasted TV, operating in accordance with a standard such as e.g. DVB-T, DVB-C, DVB-S or video streaming over the internet.

Moreover, the invention can also be used for improving the visual quality of video that has been sent over networks such as e.g. WCDMA, MBMS, DVB-H, Internet or an intranet. The suggested method can also be applied when different types of stored video, such as e.g. DVD, blue-ray disc or video on hard drive, is to be distributed from a media server to a media client.

In addition, the source media content does not have to be the original media content, i.e. the proposed method can also be used to improve the quality of media content comprising graphical information that is transcoded from a high quality to a lower quality in order to match a specific displaying standard and/or transmission media correct.

Although the current method is suitable for handling video, it may used to improve the experienced image quality in any suitable context comprising some kind of graphical information on any type of images.

The current invention described in this document improves the experienced quality of transmitted media content that includes text and other types of graphical information. Apart from removing the visual artefacts that are typically present around text and graphics when displayed together with other information, the current invention also allows the bits that were previously used for encoding the graphical information to be used to improve the quality of the visible media content around the graphical information.

ABBREVIATIONS

DCT Discrete Cosine Transform
DVB-C Digital Video Broadcast—Cable
DVB-H Digital Video Broadcast—Handheld
DVB-T Digital Video Broadcast—Terrestrial
DVD Digital Versatile Disc
FPS Frames per Second
HDTV High Definition TV
MBMS Multimedia Broadcast Multicast System
MPEG Motion Picture Experts Group
RGB Common colour model, which is mixing Red, Green and Blue.
QCIF Quarter Common Intermediate Format (176×144 pixels)
QVGA Quarter Vector Graphics Array (320×240 pixels)
SDTV Standard Definition TV
SVG Scalable Vector Graphics
WCDMA Wideband Code Division Multiple Access
YUV A colour model that defines a colour space in terms of one luma (Y') and two chrominance (UV) components

The invention claimed is:

1. A method, implemented by a media server, for distributing media content with overlay graphical information from the media server to a media client, the method comprising:
   retrieving, from a media source, one or more frames carrying media content, wherein at least one of the one or more frames encodes overlay graphical information that is integrated into viewable non-overlay media content;
   extracting, from the at least one frame, the overlay graphical information so as to exclude the viewable non-overlay media content also encoded by the at least one frame;
   transmitting the extracted overlay graphical information of the at least one frame to the media client, separately from the viewable non-overlay media content of the at least one frame;
   processing, in separate blocks, each of the one or more frames that comprise an area of overlay graphical information, the processing comprising masking an area of a block that comprises overlay graphical information and lowpass filtering the block, thereby avoiding introduction of visual artifacts in the vicinity of the overlay graphical information;
   encoding each processed frame; and
   transmitting each encoded frame to the media client, thereby enabling the media client to reproduce the media content without encoding-originated artifacts by adding the extracted overlay graphical information as an overlay on top of media content decoded from the encoded frames.

2. The method according to claim 1, wherein said processing further comprises motion compensating the content of subsequent blocks.

3. The method according to claim 2, wherein the size of each of said separate blocks corresponds to the size of a transform block.

4. The method according to claim 1, wherein the size of each of said separate blocks corresponds to the size of a macro block.

5. The method according to claim 1, wherein said media content comprises at least one image.

6. The method according to claim 1, wherein said media content comprises video.

7. The method according to claim 1, wherein said overlay graphical information comprises text.

8. A media server for distributing media content with overlay graphical information to a media client, the media server comprising:
- a content acquisition circuit configured to retrieve from a media source one or more frames carrying media content, wherein at least one of the one or more frames encodes overlay graphical information that is integrated into viewable non-overlay media content;
- an extracting circuit configured to identify and extract, from the at least one frame, the overlay graphical information so as to exclude the viewable non-overlay media content also encoded by the at least one frame;
- a transmitting circuit configured to transmit the extracted overlay graphical information of the at least one frame, to the media client, separately from the viewable non-overlay media content of the at least one frame;
- a processing circuit configured to process, in separate blocks, each of the one or more frames that comprise an area of overlay graphical information, wherein the processing circuit comprises:
  - a masking circuit configured to mask an area of a block that comprises overlay graphical information; and
  - a filtering circuit configured to low-pass filter the block, thereby avoiding introduction of visual artifacts in the vicinity of the graphical information; and
- an encoder configured to encode each processed frame provided to the encoder;
- wherein the transmitting circuit is further configured to transmit each encoded frame to the media client, thereby enabling the media client to reproduce the media content without encoding-originated artifacts by adding the extracted overlay graphical information as an overlay on top of media content decoded from the encoded frames.

9. The media server according to claim 8, wherein said processing circuit is further configured to execute motion compensating of the content of subsequent blocks.

10. The media server according to claim 8, wherein said media content comprises at least one image.

11. The media server according to claim 8, wherein said media content comprises video.

12. The media server according to claim 8, wherein the size of each of said separate blocks corresponds to the size of a transform block.

13. The media server according to claim 8, wherein the size of each of said separate blocks corresponds to the size of a macro block.

14. The media server according to claim 8, wherein said overlay graphical information comprises text.

* * * * *